UNITED STATES PATENT OFFICE.

ALBERT HESSE, OF WILMERSDORF, GERMANY.

SOLUTION OF RESINS AND THE PROCESS OF MANUFACTURING SAME.

1,003,741. Specification of Letters Patent. Patented Sept. 19, 1911.

No Drawing. Original application filed June 13, 1910, Serial No. 566,673. Divided and this application filed March 4, 1911. Serial No. 612,403.

*To all whom it may concern:*

Be it known that I, ALBERT HESSE, a subject of the German Emperor, and resident of Wilmersdorf, in the Kingdom of Prussia, German Empire, have invented new and useful Improvements in Solutions of Resins and in the Process of Manufacturing Same, of which the following is a full, clear, and exact specification.

In my application filed June 13th, 1910, Ser. No. 566,673 of which this is a divisional application, I have shown that the alkyl and aryl esters of phthalic acid, which have hitherto only been described in scientific literature, are of great technical interest since they are excellent solvents for odoriferous substances. I have further found that these esters can dissolve also resins and that in this case as well as in that of odoriferous substances their dissolving capacity is remarkably great, even a small quantity of the ester being able to dissolve a considerable quantity of the resins in question. The necessary proportion of the solvent depends on the temperature necessary for the particular resin to be dissolved. The phthalic acid esters may be used in conjunction with each other or with other solvents, whereby the solvent capacity of the latter is in many cases enhanced.

The use of phthalic acid esters as a solvent for resins is especially valuable for the following reasons: In many cases, for instance in preparing copal-varnishes, it is necessary to subject the copal resin to a heating operation in order to bring about certain decompositions which are necessary to impart to the product certain properties requisite for its technical application. The high temperature, however, is accompanied by the disadvantage that in addition to the desired decomposition, undesirable secondary changes occur which injuriously affect the properties, for instance impart to the product a dark color. The use of the aforesaid phthalic acid esters as solvents avoids this disadvantage. By heating the resin dissolved in one of the esters, instead of by melting it, the secondary changes are avoided. It is particularly advantageous that by selection of one of said esters or mixture of the same, the temperature required can be attained at ordinary pressure and can be adjusted within very wide limits depending upon the boiling point of the solvent and the concentration of the solution.

Examples.

1. 1 part of colophony is heated with 0.3 parts of phthalic acid dimethyl ester or diethyl ester, a perfectly clear solution being formed. A larger proportion of the solvent is necessary if the solution is to remain clear on cooling. This, however, is not necessary for the most technical purposes.

2. 100 kilograms of copal resin are heated with 100 kilograms of diethylphthalate until the water and the ethereal oil which are formed by the decomposition of the resin are distilled off. This solution can be used, as such or after a part of the diethylphthalate has been distilled off, for preparing varnishes and for all other purposes for which copal resin solutions are suitable.

3. 20 parts of mastic are heated with a mixture of 1 part of dimethylphthalate and 79 parts of chloroform.

What I claim is:—

1. The process of manufacturing solutions of resins, by heating said resins with resins with phthalic acid esters.

2. The process of manufacturing solutions of resins by heating said resins with phthalic acid esters and other solvents.

3. The process of manufacturing solutions of copal resin, by heating said copal resins with phthalic acid esters.

4. As a new composition of matter a solution of a resin containing a phthalic acid ester as a solvent.

5. As a new composition of matter a solution of copal resin, containing a phthalic acid ester as a solvent.

In testimony, that I claim the foregoing as my invention, I have signed my name in presence of two subscribing witnesses.

ALBERT HESSE.

Witnesses:
 WOLDEMAR HAUPT,
 HENRY HASPER.